United States Patent [19]
van der Lely

[11] Patent Number: 4,882,685
[45] Date of Patent: Nov. 21, 1989

[54] VOICE ACTIVATED COMPACT ELECTRONIC CALCULATOR

[76] Inventor: Cornelis van der Lely, 7, Brüschenrain, Zug, Switzerland

[21] Appl. No.: 259,424

[22] Filed: Oct. 17, 1988

Related U.S. Application Data

[63] Continuation of Ser. No. 900,138, Aug. 25, 1986, abandoned.

[30] Foreign Application Priority Data

Aug. 26, 1985 [NL] Netherlands ............... 8502336
Oct. 30, 1985 [NL] Netherlands ............... 8502959

[51] Int. Cl.$^4$ ............................................... G06F 3/16
[52] U.S. Cl. ......................... 364/709.11; 364/705.07
[58] Field of Search ............... 364/709.11, 710.01, 364/705.07; 381/92, 104

[56] References Cited

U.S. PATENT DOCUMENTS

| | | | |
|---|---|---|---|
| 3,356,836 | 12/1967 | Stenby | 364/710 |
| 3,876,863 | 4/1975 | Boone | 364/709 X |
| 3,895,188 | 7/1975 | Ingrahem | 381/155 |
| 3,928,960 | 12/1975 | Reese | 364/705 X |
| 4,141,073 | 2/1979 | Tan | 364/705 |
| 4,239,936 | 12/1980 | Sakoe | 381/43 |
| 4,266,278 | 5/1981 | Ebihara | 364/705 |
| 4,410,720 | 10/1983 | Hagey | 381/92 X |
| 4,418,412 | 11/1983 | Kariya | 364/709 X |
| 4,443,856 | 4/1984 | Hashimoto et al. | 364/513.5 |
| 4,532,648 | 7/1985 | Noso et al. | 381/104 X |

FOREIGN PATENT DOCUMENTS 57-55470 of 1982 Japan.
2070822 9/1981 United Kingdom.
2082820 3/1982 United Kingdom.
2149172 6/1985 United Kingdom.

OTHER PUBLICATIONS

*Microporcessors & Microsystems*, vol. 7, No. 10, Dec. 1983, "Advanced C$^2$MOS Speech Synthesizer", pp. 469-474.
Patent Abstracts of Japan, vol. 8, No. 151 (P286)(1588) 13th Jul. 1984 & JPA 5947661.
Patent Abstracts of Japan, vol. 6, No. 171 (P.140) (1049), 4th Sep. 1982.
Patent Abstracts of Japan, vol. 7, No. 234 (P-230) (1379), 18th Oct. 1983 & JPA 58123134.
Patent Abstracts of Japan, vol. 5, No. 175 (P-88) (847), 11th Nov. 1981 & JPA 56105528.
Handpulled Magnetic Card, Mass Storage System for Portable Computer, Hewlett-Packard Journal, Jun. 1983, pp. 15-19 and 21-23.
Basic Aus der Jackentasche, Funkschau, 9/1983, pp. 77-80.
European Speakup with Voice Recognition, Mimi-Micro Systems, Aug. 1985, p. E2.
Numeric and Alphanumeric Displays–New and Old Technologies Share the Spotlight, EDN, Feb. 5, 1978, pp. 26-35.

*Primary Examiner*—David H. Malzahn
*Attorney, Agent, or Firm*—Penrose L. Albright; Robert A. Miller

[57] ABSTRACT

A compact electronic calculator comprising a screen, electronic circuits, a microphone, voice recognition circuits which are exchangeable depending upon the context of the verbal data to be received by the calculator and the language in which the data is provided. The calculator is thus responsive to numerals and symbols spoken in a selected language or languages and this is transformed through the circuitry of the calculator to be seen on an elongated display unit. A calculator is also responsive to action words such as "multiply", "divide", "add" and "subtract", so that the calculator carries out these functions on the displayed numerals and symbols. The calculator does not have a keyboard and is of a small size, approximately ten centimeters in length, one centimeter in width and one-half centimeter in depth. It can be incorporated in a pen form or, in a smaller version, incorporated into a wristband or the like. The microphone is preferably uni-directional although it may also be such that it receives voice signals from a number of different directions. The calculator is adjustable so that different selected acoustical decibel levels may be required to actuate the calculator.

9 Claims, 3 Drawing Sheets

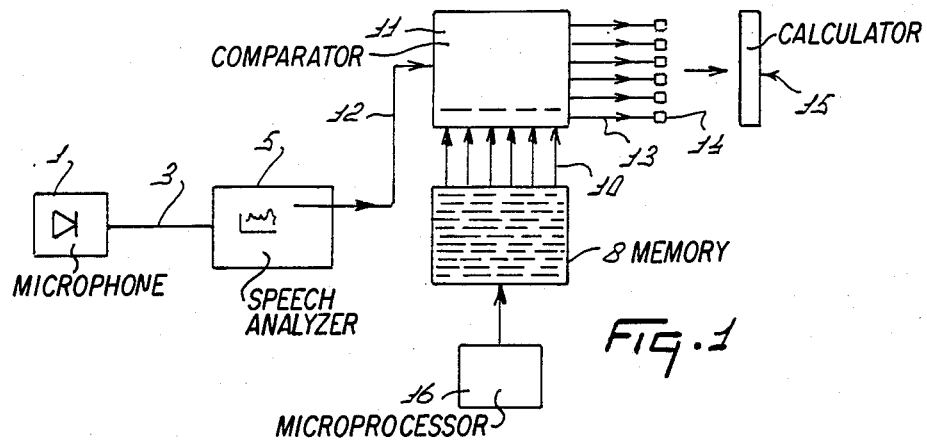
FIG. 1
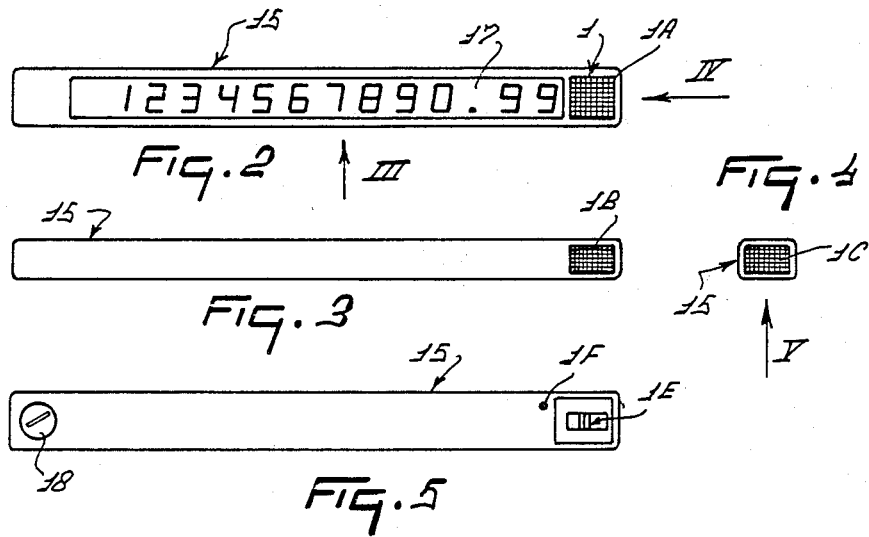
FIG. 2
FIG. 3
FIG. 4
FIG. 5
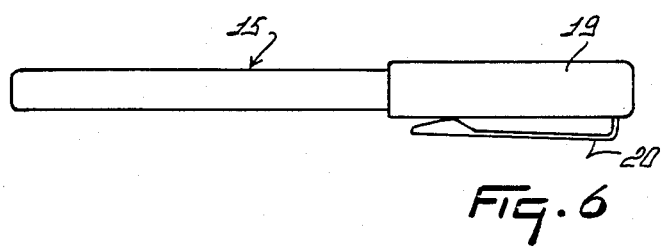
FIG. 6

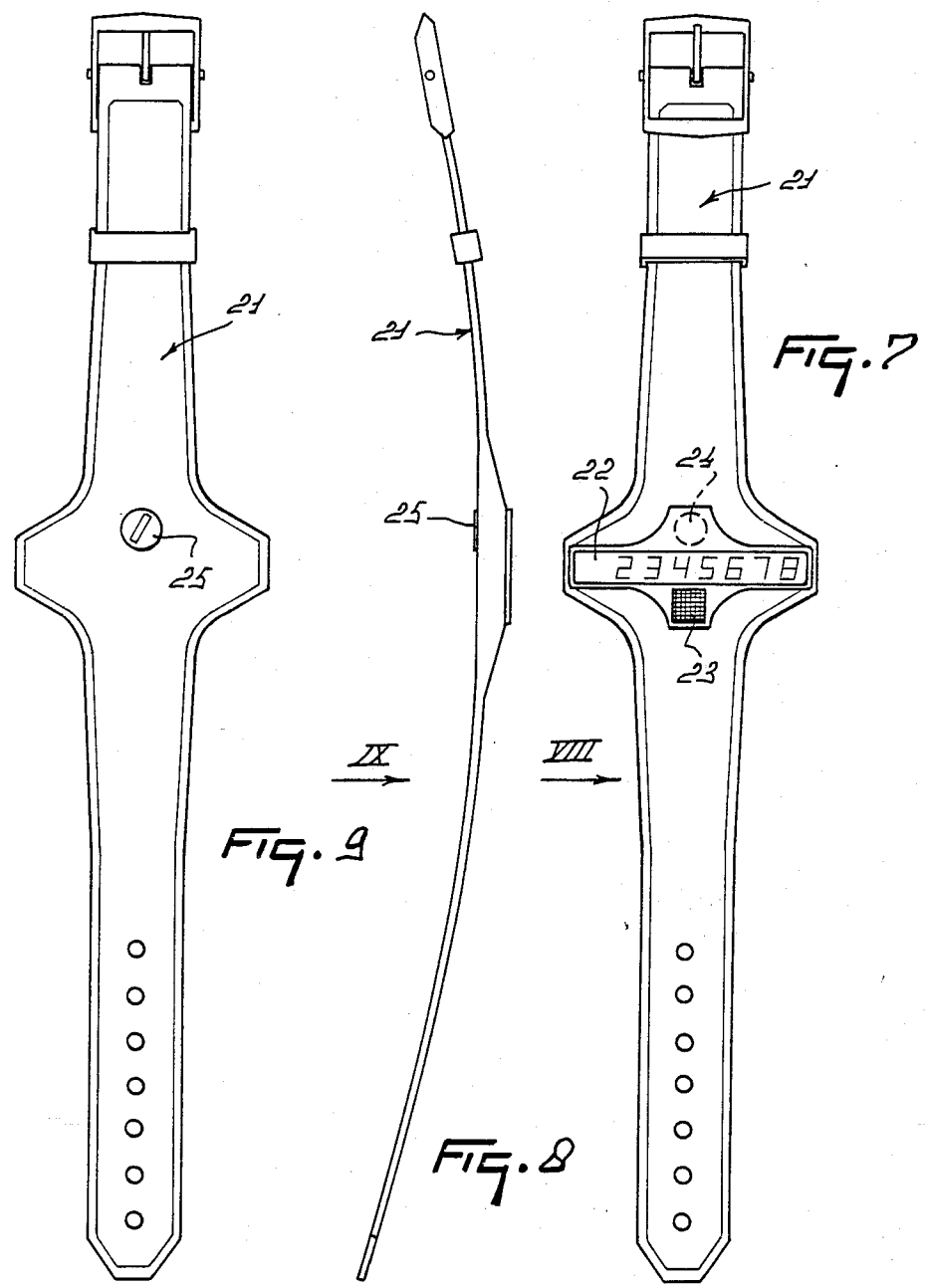

VOICE ACTIVATED COMPACT ELECTRONIC CALCULATOR

This is a continuation of Ser. No. 900,138, filed Aug. 25, 1986, now abandoned.

SUMMARY OF THE INVENTION

The invention relates to a compact electronic calculator such as a pocket or wrist calculator, provided with a screen, electronic circuits and one or more operating devices.

Known calculators are, provided with a keyboard through which the calculators are operated.

Such known calculators, no matter how compact their construction is, are relatively bulky due to the presence of the keyboard. Further, with known calculators for easy and rapid operation of the keyboard a certain amount of experience is usually required.

The object of the invention is to improve known calculators so as to provide a small and compact electronic calculator which can be operated very easily with little or no prior experience.

According to the invention, the calculator is provided with at least one operating device which is actuated by human voice, that causes numerals and/or symbols to be produced on the screen.

The invention further comprises a calculator having a microphone which is designed to receive substantially only sound from a certain direction whereby the operation of the calculator is improved.

Further the invention comprises a calculator which is operated by voice recognition and is provided comprises exchangeable programs for different languages so that, the calculator is adaptable to be easily usable in various languages.

For a better understanding of the invention, and to show how the same may be carried into effect, reference will now be made, by way of example, to the following accompanying drawings.

BRIEF DESCRIPTION OF THE DRAWINGS

FIG. 1 comprises an example of a diagram of circuits in broad outline;

FIG. 2 is a plan view of a calculator in accordance with the invention;

FIG. 3 is a side elevation of said calculator according to the arrow III in FIG. 2;

FIG. 4 is a side elevation according to the arrow IV in FIG. 2;

FIG. 5 is a bottom view according to the arrow V in FIG. 4;

FIG. 6 is a side elevation of the device, provided with a cap;

FIG. 7 is a plan view of a another embodiment comprising wrist calculator;

FIG. 8 is a side elevation according to the arrow VIII in FIG. 7;

FIG. 9 is a bottom view according to the arrow IX in FIG. 8.

DESCRIPTION OF THE PREFERRED EMBODIMENTS

Figure 10:
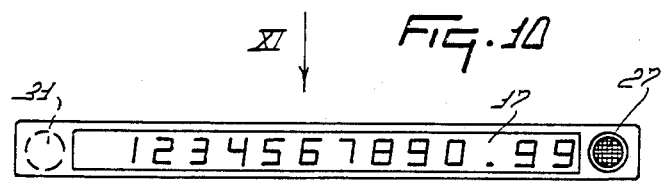
FIG. 10 is a plan view of a further embodiment of a calculator according to the invention.

An example of a circuit that may be used in the electronic device according to the invention, in this case a calculator, is shown in FIG. 1. The analogous signal, produced by a microphone 1, is connected with a speech analyzer 5 which, together with other elements of the device constitutes a voice recognizer reacting to specific words uttered by persons.

The speech analyzer 5 is constructed in such a way that the signal, produced by the microphone 1 and representing a certain operation command (e.g. "one", "three", "nine", "zero", "add", "multiply", "root", etc.), is converted into digital pulses. These pulses e.g. couched as a number of digitals representing the acoustic signal can be transmitted to a comparator 11 through a connection 12. The speech analyzer 5 is, preferably and according to the embodiment explained, selective as to words uttered by different persons, but non-selective or less selective as to the pitch of the spoken words.

The comparator 11 is connected with a memory 8 by means of a bus 10. In the memory locations of said memory 8 a number of groups of digital words may be stored, with each group corresponding with a word, registered by a program and present in a digital shape, said word representing one of the operation commands mentioned. An acoustic signal, uttered by the speaker during operation of the device, is fed into the voice and/or speech analyzer 5 via the input 3. The resulting digital word is conveyed to the comparator 11 through the connection 12, which comparator compares the word with each of the operation commands, stored in a digital shape in the aforementioned groups of memory locations of the memory 8. The scanning of these memory locations is steered by a micro-processor 16 with instruction memory, complementing the comparator 11 and the memory 8. If the comparator establishes that a word, received through the connection 12 of the speech analyzer 5, corresponds with one of the words stored in the memory 8, the comparator issues to its output bus 13 a digital number which corresponds with the address of memory locations in which the relevant, recognized word occurs in the memory 8. This digital number may have a limited size, e.g. any of the numerals 0 through 9 for the numerical values to be put in, and some numeral operation commands, since the number of acoustically spoken commands in this embodiment, i.e. with a calculator, may be restricted to a small number of words. This digital number is compared, e.g. through a range of simple comparators 14, with the operation commands (numeral and operation commands) that match the electronic control circuits incorporated into the circuit or systems with similar functions in a built-in processing device, in this case a calculator 15. In this way a pulse is conveyed to a respective one of these circuits, so that the uttered word is transmitted to the calculator.

The expressed word will then appear on the screen. The circuit of the calculator 15 itself may correspond with that of a usual calculator.

The device, shown in the FIGS. 2 to 6 is a calculator of oblong shape and is provided with a screen 17, mounted on one of the long sides of the device. Preferably, the screen has a length, sufficient for comprising 10 digits or more, so that the length of the device broadly matches that of a usual pen and, hence, can be easily carried in one's pocket. The device according to this, embodiment has a length of approximately ten centimeter, a width of approximately one centimeter and a thickness of approximately one-half centimeter. According to another aspect of the invention, the width of the device broadly corresponds with the height of the row of digits on the screen.

At the end of the screen 17 the microphone 1 is arranged, while a battery with cover 18 (FIG. 5) is arranged in the device near the other end of the screen. The circuits of the calculator are mounted behind the screen. Preferably, the microphone 1 has inputs on at least two sides of the device, in this case three openings; 1A, 1B, 1C (see FIGS. 2, 3 and 4).

On the end where the microphone is mounted a slide regulator 1E is provided, by means of which a built-in amplification of the acoustic signal may be adjusted; this feature makes it possible, on the one hand, to speak into the microphone at a distance of e.g. three centimeters from the microphone, inaudible for other persons. On the other hand, it is possible to speak, at an altered, amplification, at a distance of e.g. twenty-five centimeters from the microphone, the screen being clearly readable at the same time.

As shown in FIG. 6, the device may be provided with a cap 19 with clip 20, ensuring that the microphone is protected and that the device may be carried in the inside of a pocket. The calculator according to the invention offers the advantage of simplicity and compactness and of simplicity of control, since the risk of errors is smaller in case of spoken words in comparison with the use of a keyboard with small buttons.

It may be of advantage if the microphone is arranged at one end of the calculator, as in that case the calculator can be operated conveniently.

Preferably, the calculator has a length, of approximately ten centimeters, a width of approximately 1 centimeter and a thickness of approximately one-half centimeter (FIG. 2 through 4), while it is in transverse section about rectangular (FIG. 4).

It is of advantageous for the calculator to be manufactured of synthetic material, and for the calculator to be provided with a switch 1F making it possible (by partly moving the switch) to illuminate the screen, so that the device can also be used when it is rather dark.

The FIGS. 7 and 8 comprise another embodiment of the invention. The relevant device comprises a wristband or bracelet 21, making it possible to wear the calculator on one's wrist, or as a necklace. Such calculator comprise a screen 22, a microphone 23, and a battery 24 with a cover 25 therefor on the rear side of the calculator. Battery 24 is mounted on the inside of the calculator. This calculator is capable of being operated in the same manner, as the calculator described with reference to FIGS. 1 through 6, while it also offers the advantages of easy use. If desired, an electronic watch may be incorporated into the device, simultaneously with the calculator, for both of which the screen 22 can be used. The diagram of circuits (FIG. 1) may remain substantially the same; the number of acoustic signals, required for a watch, may be smaller than that required for a calculator. If required, the watch may comprise an alarm and both setting of the watch and of the alarm may take place by means of spoken words.

A further embodiment of the calculator according to the invention is shown in the FIGS. 10 through 13. This embodiment has the characteristics described hereafter whereas other characteristics not specifically described may be the same as those in the first embodiment.

The device according to the second embodiment comprises a so-called "conical" microphone 26, which substantially converts words into electrical signals, when these words reach the microphone from a certain direction.

A single, sound-absorbing opening 27 of the microphone is provided at the side of the calculator casing, in which the screen 17 is also arranged. Preferably, this opening 27 is situated directly next to the screen 17 and near an extremity of the oblong casing of the device. Through the application of the microphone 26 which is basically perceptive to sounds which reach the microphone, in the arrangement in question, in a direction which is perpendicular to the plane of the screen, it is possible to control the device acoustically in such a way that interfering noises coming from other directions are suppressed.

The words to be put into the memory 8, expressing e.g. numerical values as well as those which represent e.g. numeral operations, can be transmitted electronically into the memory. Carriers of such words, which may already have been changed into digital pulses, will be indicated as programs 28.

Figure 13:
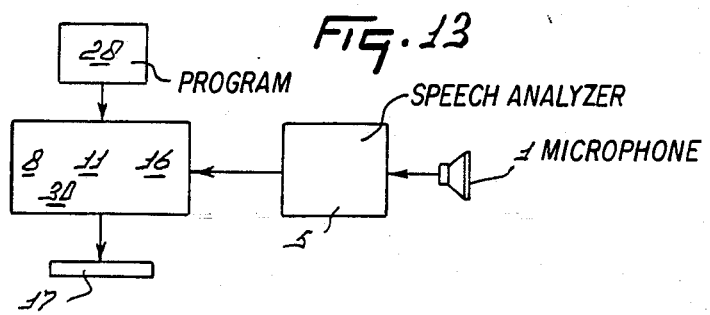
FIG. 13 is a block diagram of the embodiment according to the FIGS. 10-12.

The programs 28 can be inserted into a slot 29 in the casing of the calculator (cf. block diagram according to FIG. 13).

Once all words of a program 28 have been transmitted into the memory, the calculator is ready for operation. The words uttered by the user, converted into digital words by the speech analyzer 5, are put into the comparator 11 through the connection 12, said comparator comparing each of these words with words, filed in the memory 8 by the program 28 (the program 28 being read by a program reading device 30), whereby the comparator 11 is supported by the microprocessor 16, as in the first embodiment.

In this way the possibilities of the application of the device according to the second embodiment, in respect of the device according to the first embodiment can be considerably extended, since programs for a variety of different ranges of application can be inserted into the device, such as programs in the fields of finance, technics, administration and the like, but also programs which refer to several languages or programs which comprise e.g. words for numerical values and words for operations of numerals to be carried out (resp. words for other fields of application) in different languages. Examples are programs with the words "pi", "times", "minus", "square", "root", "per cent", "is", resp. "dollar", "franc", resp. "triangle", "acceleration", "power", "mass", resp. "debit", "credit" in the English, German, French or another language.

Figure 11:
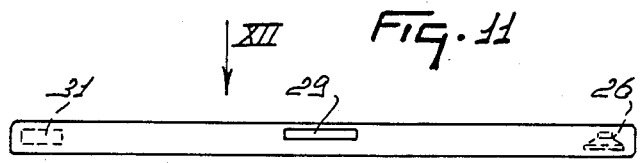
FIG. 11 is a side elevation of the device according to the arrow XI in FIG. 10.
Figure 12:
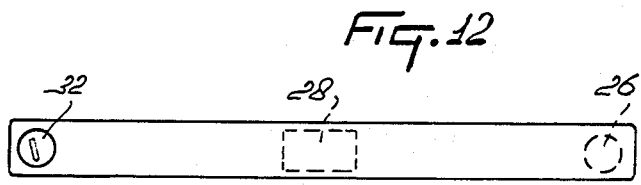
FIG. 12 is a view according to the arrow XII in FIG. 11.

It is also possible, however, that a device is destined for one objective only and that it is provided to that effect with a fixed program to meet the objective involved, e.g. calculations only; in that case the device may comprise a non-exchangeable memory 8. Provided within the casing of the device, manufactured of synthetic material and having the shape of a parallelepiped, is a supply battery 31 near the end of the casing, said battery being accessible via a removable cover 32 (FIG. 10 through 12). The slot 29 for inserting the programs is provided in the side plane which adjoins the plane in which the screen 17 is situated. During operation the slot 29 is situated on the top side of the device, while the program is situated behind the screen 17. The circuits, too, are provided mainly behind the screen 17. The casing of the device has an oblong shape and has a thickness, embracing the smallest sizes, in a rectangular or square shape, e.g. one by one centimeters, with a length of up to approximately 10 cm.

When operating the calculator, the calculator may be switched on by saying, e.g. "on". The voice recognition system recognizes this command and actuates the circuit in question. Furthermore, the device responds to the usual words that are necessary in order to be able to add, substract, multiply, divide, etc.

Manual control by means of key-board buttons is not necessary. The device is small and easy to operate. By means of different programs the device can be used in several languages. Furthermore, programs for various fields of application can be used, such as finance, technics, etc. The device may also be definitely equipped in such a way that it is suitable only for one language or only for one kind of operation.

The invention is not restricted to the embodiments, described and shown herein, but may also be used in other, compact embodiments.

Although the embodiments shown should be considered as explanations of the best modes contemplated by the inventor of carrying out his invention, the inventive concepts as such should not be considered as necessarily restricted to these specific embodiments, but may cover other disclosed elements and relationships individually or in combination which meet constitutional and statutory criteria for patentability.

Having disclosed my invention, what I claim as new and to be secured by Letters Patent of the United States is:

1. A compact electronic calculator comprising:
   a display screen for displaying calculator inputs and outputs;
   a microphone for receiving audible inputs consisting of numbers and operative words and converting said audible inputs to electrical signals;
   a speech analyzer means coupled to said microphone for converting said electrical signals from said microphone into digital words;
   an electronic memory, said electronic memory string digitized words representing said numbers and said operative words;
   an electronic comparator means, said comparator means coupled to said speech analyzer for receiving said digital words and for comparing said digital words to digitized words stored in said electronic memory, said electronic memory also being coupled to said comparator means;
   a processing means coupled with said electronic memory, said processing means controlling the comparison of each said digital word to said digitized words such that said comparator produces a digital number corresponding to an address location in said electronic memory for a digitized word that matches a digital word generated by said speech analyzer;
   a plurality of simple comparators, said simple comparators being electronically coupled to said electronic comparator means to receive said digital numbers; and
   execution means for executing said audible inputs and displaying the result on said display screen, each said simple comparator, upon recognition of a designated digital number actuating said execution means.

2. A compact electronic calculator as claimed in claim 1, wherein said calculator is oblong and has a length sufficient to permit display of at least ten digits on said screen and a width of approximately one-tenth of said length.

3. A compact electronic calculator as claimed in claim 2 wherein the calculator has a length of approximately ten centimeters, a width of approximately one centimeter and a thickness of approximately one-half centimeter.

4. A compact electronic calculator as claimed in claim 1 wherein said microphone is arranged and constructed so that substantially only sound coming from a predetermined direction is received adequately to actuate said speech analyzer to respond to said number and operative words.

5. A compact electronic calculator as claimed in claim 1 wherein said microphone is arranged on said calculator adjacent said screen.

6. A compact electronic calculator as claimed in claim 1 comprising a user adjustable regulator for adjusting the amplitude of said audible sounds required by said microphone to actuator the calculator.

7. A compact electronic calculator as claimed in claim 1 further comprising a clock circuit, said clock circuit being activated by one of said simple comparators through said execution means wherein a time is displayed on said screen in response to an audible input of one of said operative words.

8. A compact electronic calculator as claimed in claim 1 further comprising means for selectively reprogramming said electronic memory to enable the calculator to recognize and be responsive to words of a different language.

9. A compact electronic calculator comprising:
   a case;
   a display screen visibly mounted in said case, said display screen providing means for displaying inputs and outputs of the calculator;
   a microphone for receiving human voice generated audio inputs, said microphone mounted in said case proximate said display screen;
   electronic circuit means linking said microphone and said display screen for processing electrical signals generated by said microphone is response to said audio inputs to produce visual outputs on said display screen wherein said electronic circuit means further comprises;
   a speech analyzer for receipt of said electrical signals from said microphone and converting said electrical signals to digital words;
   a comparator, electronically coupled to said speech analyzer for receiving said digital words and comparing said digital words with digitized words;
   a memory electronically linked to said comparator; said memory storing said digitized words used by said comparator, said memory being replaceable to provide means for selectively reprogramming the calculator from processing said audio inputs in one language to processing said audio inputs in a different language;
   a processing means for controlling the comparison by said comparator of each said digital word to digitized words stored in said memory to produce a digital number; and
   a series of simple comparators, said digital number being electronically passed to said series of simple comparators, one of said simple comparators recognizing said digital number to actuate specific operations corresponding to said audio input.

* * * * *